United States Patent [19]

Peterson

[11] 4,173,111
[45] * Nov. 6, 1979

[54] VENTED GRASS-CATCHER COVER

[75] Inventor: James F. Peterson, Cedarburg, Wis.

[73] Assignee: Allis-Chalmers Corporation, Milwaukee, Wis.

[*] Notice: The portion of the term of this patent subsequent to Sep. 13, 1994, has been disclaimed.

[21] Appl. No.: 825,531

[22] Filed: Aug. 18, 1977

[51] Int. Cl.² .......................................... A01D 35/22
[52] U.S. Cl. ..................................... 56/202; 56/320.2
[58] Field of Search ............... 56/202, 203, 16.6, 13.4, 56/320.2

[56] References Cited

U.S. PATENT DOCUMENTS

| | | | |
|---|---|---|---|
| 2,990,666 | 7/1961 | Blume | 56/202 |
| 3,321,893 | 5/1967 | Leader | 56/202 |
| 3,367,091 | 2/1968 | Weiland | 56/202 |
| 3,423,917 | 1/1969 | Leader | 56/202 |
| 3,521,436 | 7/1970 | Venzke | 56/202 |
| 3,522,695 | 8/1970 | Musgrave | 56/202 |
| 3,822,536 | 7/1974 | Leader | 56/202 |
| 3,961,467 | 6/1976 | Carpenter | 56/202 |
| 3,971,198 | 7/1976 | Lane | 56/202 |
| 3,974,631 | 8/1976 | Rhodes | 56/202 |
| 4,047,368 | 9/1977 | Peterson | 56/202 |

Primary Examiner—Louis G. Mancene
Assistant Examiner—Paul J. Hirsch
Attorney, Agent, or Firm—Charles L. Schwab

[57] ABSTRACT

A grass catcher is mounted on the rear of the riding type mower to receive grass clippings from the mower unit. The grass catcher includes a bag suspended from a rectangular frame and a cover to keep the grass clippings within the bag. The cover is of a novel construction and includes a rearwardly disposed vent or louver extending rearwardly beyond the frame to which the grass-catcher bag is connected. The overhanging vent portion extends substantially the full transverse width of the grass-catcher bag and its supporting frame, and includes a downwardly facing discharge opening. A vertically disposed screen is mounted within the grass-catcher cover immediately forward of the downwardly facing discharge opening. The screen also extends substantially the full transverse width of the grass catcher and its supporting frame so that the grass clippings blown into the grass catcher will not escape with the air passing through the downwardly facing opening. The grass-catcher cover venting arrangement allows good exhaust of air from the grass catcher whereby resistance to movement of clippings from the mower into the grass catcher is minimized by minimizing the back pressure acting on the discharge tube of the mower. The cover has a pair of laterally spaced, downwardly facing recesses at its front for accommodating the discharge tubes of either right or left discharging mowers. A deflector is mounted within the grass catcher to deflect grass clippings from the lateral side thereof receiving same from the mower to the other lateral side of the grass catcher thereby achieving a relatively even filling of the receptacle.

5 Claims, 7 Drawing Figures

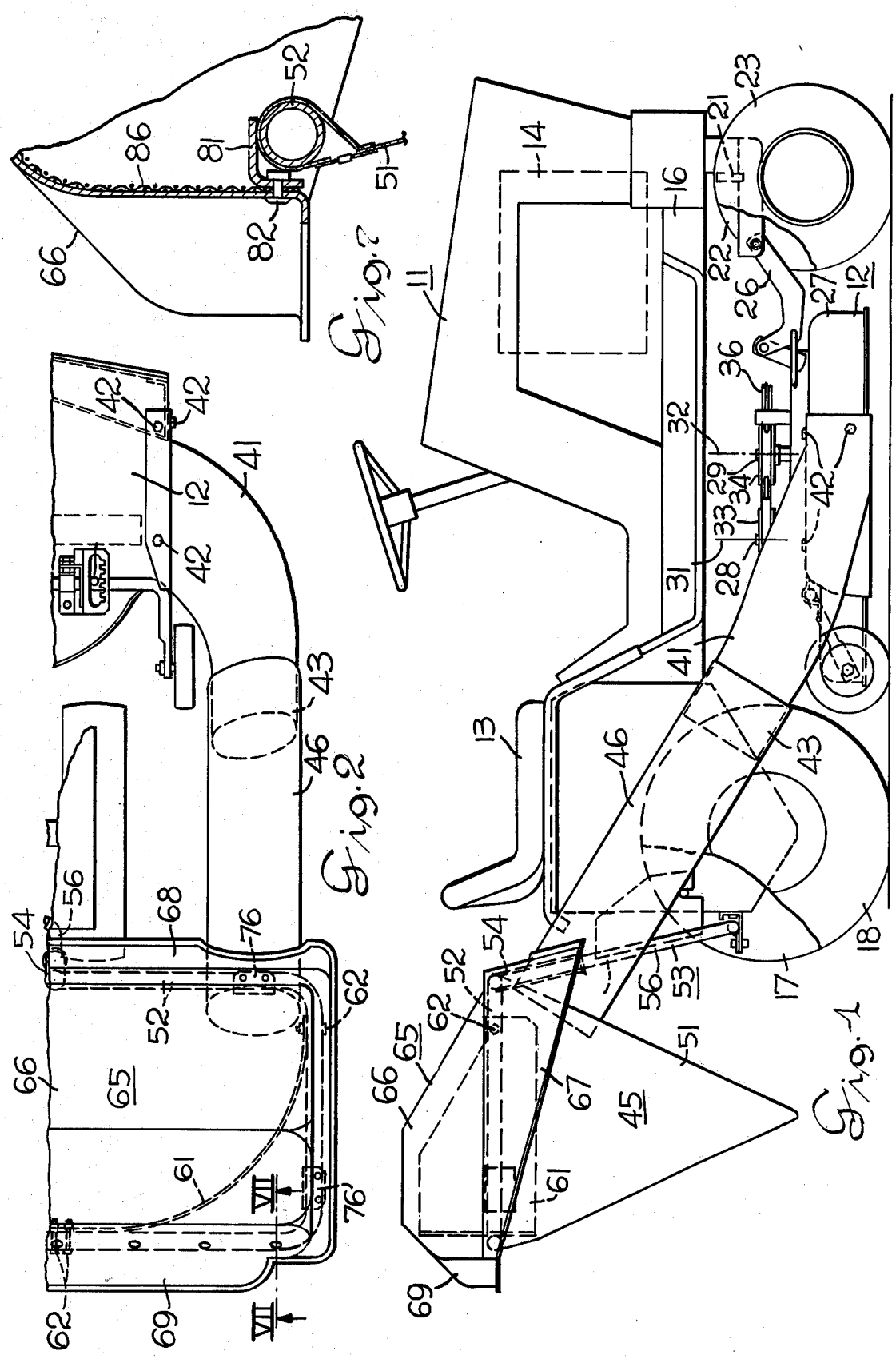

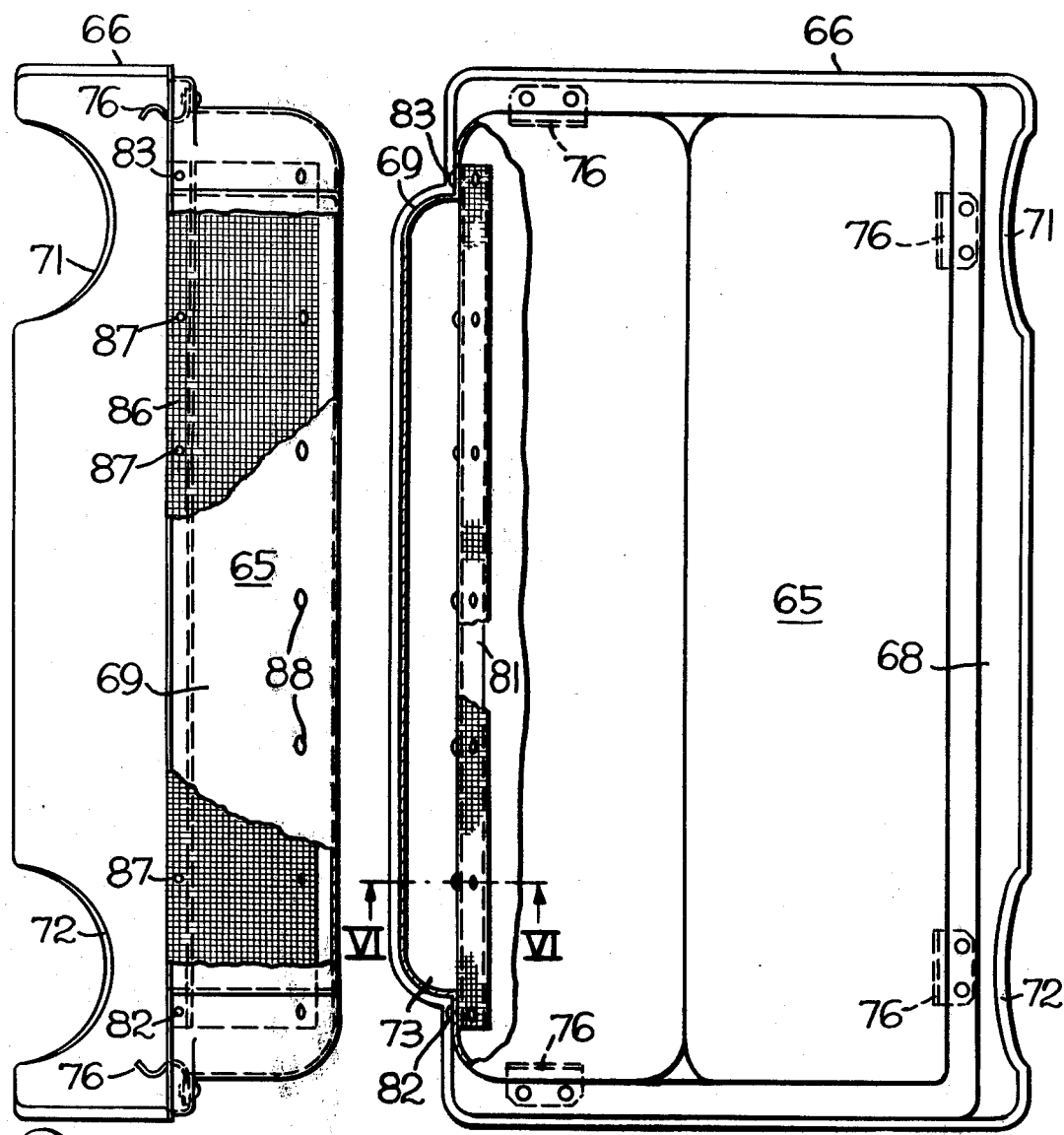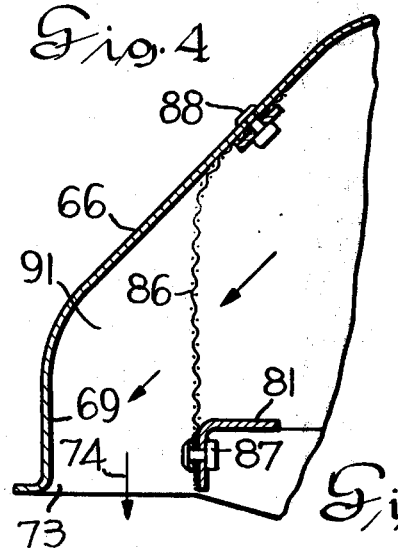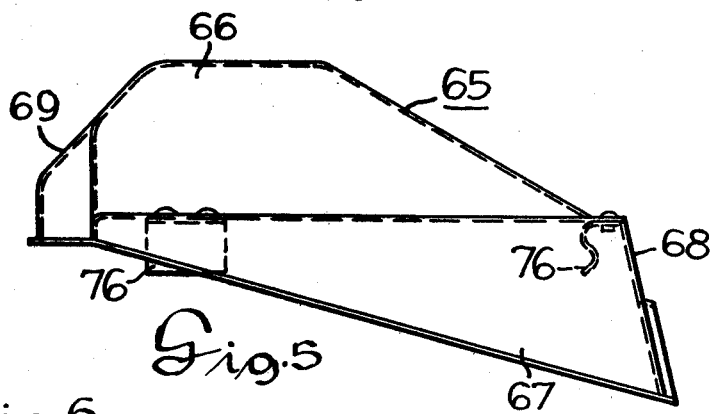

VENTED GRASS-CATCHER COVER

RELATED APPLICATIONS

This invention is substantially disclosed in my copending U.S. patent application Ser. No. 747,694, filed Dec. 6, 1976, for Grass Collecting Multiple Blade Mower without Auxiliary Blower Means, now U.S. Pat. No. 4,106,272.

BACKGROUND OF THE INVENTION

A screen section is interposed between a grass-catcher cover and the grass-catcher bag in my copending U.S. patent application Ser. No. 709,871, filed July 29, 1976, entitled "Attachment for Collecting Mower Discharge in a Plurality of Bags", now U.S. Pat. No. 4,047,368 The grass catcher shown in U.S. Pat. No. 3,199,277 has a screened cover. U.S. Pat. No. 3,974,631 shows a cover with a depending perforated screen disposed above a pair of containers supported at the back of a riding mower. U.S. Pat. No. 3,958,401 shows a grass catcher mounted on the rear of the riding mower wherein an annular brush is utilized between the bag and the cover for directing clippings into the bag and for permitting escape of air.

BRIEF DESCRIPTION OF THE INVENTION

The rear mounted grass catcher for a riding mower includes an impervious removable cover which has an air discharge louver extending rearwardly beyond the receptacle portion of the grass catcher across substantially the full width of the receptacle to direct the discharge air from the air catcher downwardly at the rear thereof. A vertically disposed screen is disposed in the air passageway of the louver. The vertical dimension of the screen is greater than the fore and aft width of the discharge opening thereby providing a relatively large screen area for filtering any clippings from the discharge air. By providing a large discharge opening and a large screen area, the velocity of the discharge air is reduced to such an extent that there is less tendency for clippings to clog the screen and back pressure on the mower discharge is minimized. The louver prevents rain from entering the bag by way of the air discharge opening and directs the discharge air downwardly to the ground thus minimizing and confining dispersement of dust and fine particles.

An internal deflector may be used to facilitate even filling of the grass catcher. The deflector is positioned forwardly of the screen a predetermined distance so as not to block passage of air through the screen.

The molded cover may incorporate two (2) downwardly facing recesses in its front skirt so as to permit the molded cover component to be used for grass catchers for both right and left discharge mowers.

BRIEF DESCRIPTION OF THE DRAWINGS

One embodiment of the present invention is illustrated in the drawings in which:

FIG. 1 shows a riding mower with a rear mounted grass catcher incorporating the present invention;

FIG. 2 shows a partial top view of the riding mower and grass catcher illustrated in FIG. 1;

FIG. 3 is a top view of the cover for the grass catcher with parts broken away for illustration purposes;

FIG. 4 is a rear view of the grass-catcher cover shown in FIG. 3 with parts broken away for illustration purposes;

FIG. 5 is a side view of the grass-catcher cover shown in FIGS. 3 and 4;

FIG. 6 is a section view taken along the line VI—VI in FIG. 3; and

FIG. 7 is a section view taken along the line VII—VII in FIG. 2.

DETAILED DESCRIPTION OF THE INVENTION

Referring to FIGS. 1 and 2, the riding mower includes a tractor 11 and an underslung mower attachment 12. The tractor 11 includes an operator's station 13 and a conventional steering wheel. A power unit such as internal combustion engine 14 is mounted on the front of the tractor frame 16 and provides the power for driving a pair of rear drive wheels 17, 18. The tractor also includes an oscillating transverse axle 21 secured to the frame 16 by a central longitudinal pivot, not shown, and a pair of steerable wheels 22, 23. The mower attachment 12 is connected in draft relation to the axle 21 by draft link 26 which is pivotally connected at its rear end to a bracket structure extending upwardly from the mower housing 27. The mower includes a pair of vertical spindles 28, 29 rotating about the vertical axes 31, 32 and carrying at their upper ends V-belt pulleys 33, 34 about which a V-belt 36 is disposed. Mower clippings are discharged from the right side of the mower housing 12 into an elbow 41 secured to the housing by cap screws 42. The rear end 43 of the elbow 41 telescopically fits within a mower discharge tube 46 which extends rearwardly to a rear mounted grass-catcher 45.

The grass catcher 45 includes a receptacle in the form of a bag 51 secured to a horizontally disposed rectangular frame part 52 of the bag support 53. The bag support 53 is in two parts with the part 52 having downwardly extending sleeves 54 which telescopically fit over a part of upstanding cylindrical legs of a support part 56 which is secured to the rear of the tractor. The bag 51 is releasably secured to the rectangular tubular frame 52 as by a zipper. A clipping deflector 61 is secured to the rectangular frame 52 by fasteners 62 and serves to deflect the clippings discharged from the tube 46 toward the left end of the receptacle. The deflector simultaneously accomplishes two things; namely, an even loading of the receptacle with grass clippings and prevention of discharge of the grass clippings directly into the air discharge screen which will hereinafter be discussed. A removable cover structure 65 is mounted on top of the rectangular frame 52 and includes a nonpliant or rigid cover 66 having a side skirt 67 on each lateral side and a front skirt 68. The cover 66 includes a main part disposed above the receptacle 51 and a rearwardly extending discharge louver 69 at the rear of the main part which extends substantially the full width of the receptacle or bag 51 and the rectangular frame part 52.

Referring also to FIGS. 3 through 7, the cover 66 which preferably is made of molded plastic includes a pair of semicircular recesses 71, 72 in the front dust shield or skirt 68 to permit the cover to be used with grass catchers for either a right discharging or left discharging mower. The louver 69 extends rearwardly beyond the grass-catcher receptacle frame 52 and has a downwardly facing discharge opening 73 through which discharge air is vented toward the ground in the direction of the arrow 74. Four spring-like clips 76 are riveted to the cover 66 so as to releasably attach it to the rectangular frame part 52 of the grass-catcher support 53. A transverse member in the form of an angle 81 is secured to opposite ends to the cover 66 by a pair of rivets 82, 83 as illustrated in FIGS. 3 and 4. The horizontal flange of the angle 81 rests on the rectangular frame part 52 and the vertically disposed flange of the angle 81 serves as a support for the lower end of a discharge screen 86 which is secured thereto by the rivets 82, 83 and a plurality of other rivets 87. The upper end of the screen is secured to an upper portion of the main part of the cover 66 by rivets 88. Air discharged from the receptacle by way of the discharge opening 73 of the louver 69 will pass through the screen 86, thus, preventing discharge of any significant amount of clippings.

From the drawings and description it will be noted that the interior of the louver 69 defines an air discharge passage 91 between the main part of the cover 66 and the discharge opening 73. The vertically disposed screen 86 extends across the passage 91 at its junction with the interior of the main part of the cover 66 and at this junction the passage has a greater cross sectional area than the cross sectional area thereof at the discharge opening. Thus the screen will not unduely restrict the exit of air from the interior of the grass catcher. I prefer that the area of the discharge opening 73 of the louver 69 be at least 1.8 times the cross sectional area of the discharge tube 46 so as to minimize back pressure on the discharge of grass from the mower into the grass catcher. The back pressure is also held to a minimum by employing a very short discharge passage 91 which terminates at the discharge opening 73 at substantially the same elevation as the top of the receptacle 51. Since the screen is vertically disposed, grass clippings hitting the screen will tend to fall by gravity into the receptacle. The placement of the screen makes it accessible for the operator to wipe any clippings or the like off the screen (if any significant amount actually lodges on the screen) when the cover is removed to empty the bag 51. The deflector 61 is disposed in the path of the rearwardly directed clippings from the tube 46 and forwardly of the screen a predetermined distance so as not to block passage of air through the screen 86. Specifically, the deflector 61 is spaced from the screen 86 at least the horizontal dimension of the horizontal flange of angle 81.

The cover of the present invention provides a downwardly directed rear discharge of air from the grass catcher thereby minimizing dispersion of dust and fine particles. The downward discharge of air avoids directing the discharge horizontally which would be objectionable to persons who might be in close proximity to the riding mower. It also directs the dust and other fine particles toward the ground rather than into the immediate atmosphere to the discomfort of the operator and other persons in the vicinity of the lawn cutting operation.

The embodiments of the invention in which an exclusive property or privilege is claimed are defined as follows:

1. A grass catcher comprising:
   support means for said grass catcher adapted for connection to the rear of a riding mower whereby said grass catcher is mounted in an elevated position at the rear thereof when installed thereon,
   an upwardly opening receptacle secured to said support means, and
   a cover structure releasably mounted on the top of said receptacle including
   a rigid impervious cover having a main part resting on said receptacle and a rearwardly extending louver at the rear of said main part, said louver extending rearwardly of said receptacle and presenting a downwardly facing discharge opening extending substantially the full transverse width of said receptacle, the inside of said louver constituting a discharge passage connecting the interior of said cover with said discharge opening, said discharge opening being at substantially the same elevation as the top of said receptacle, and
   a vertically disposed screen secured to and within said cover across said discharge passage adjacent the junction of said louver with said main part of said cover whereby grass clippings hitting said vertically disposed screen will tend to fall by gravity into said receptacle.

2. The grass catcher of claim 1 wherein said cover structure includes a transverse member connected at its opposite ends to said cover and disposed adjacent to and above the rear of said receptacle, said transverse member being disposed at the front of said discharge opening and wherein the lower portion of said screen is secured to said transverse member.

3. The grass catcher of claim 1 wherein the area of said discharge passage across which said screen extends is greater than the area of said discharge opening.

4. The grass catcher of claim 1 wherein an opening is provided adjacent one lateral side thereof for receiving rearwardly directed grass clippings from said riding mower and wherein a grass clipping deflector is mounted within said grass catcher a predetermined distance forwardly of said screen and in the path of said rearwardly directed grass clippings so as to direct grass clippings toward the other lateral side of the grass catcher.

5. The grass catcher of claim 1 wherein the front of said cover has a pair of laterally spaced, downwardly facing recesses adapted alternately to partially receive a discharge tube extending rearwardly from either a right or left discharging mower.

* * * * *